No. 775,310. PATENTED NOV. 22, 1904.
M. PFATISCHER.
VARIABLE SPEED MOTOR.
APPLICATION FILED APR. 7, 1904.
NO MODEL. 3 SHEETS—SHEET 1.
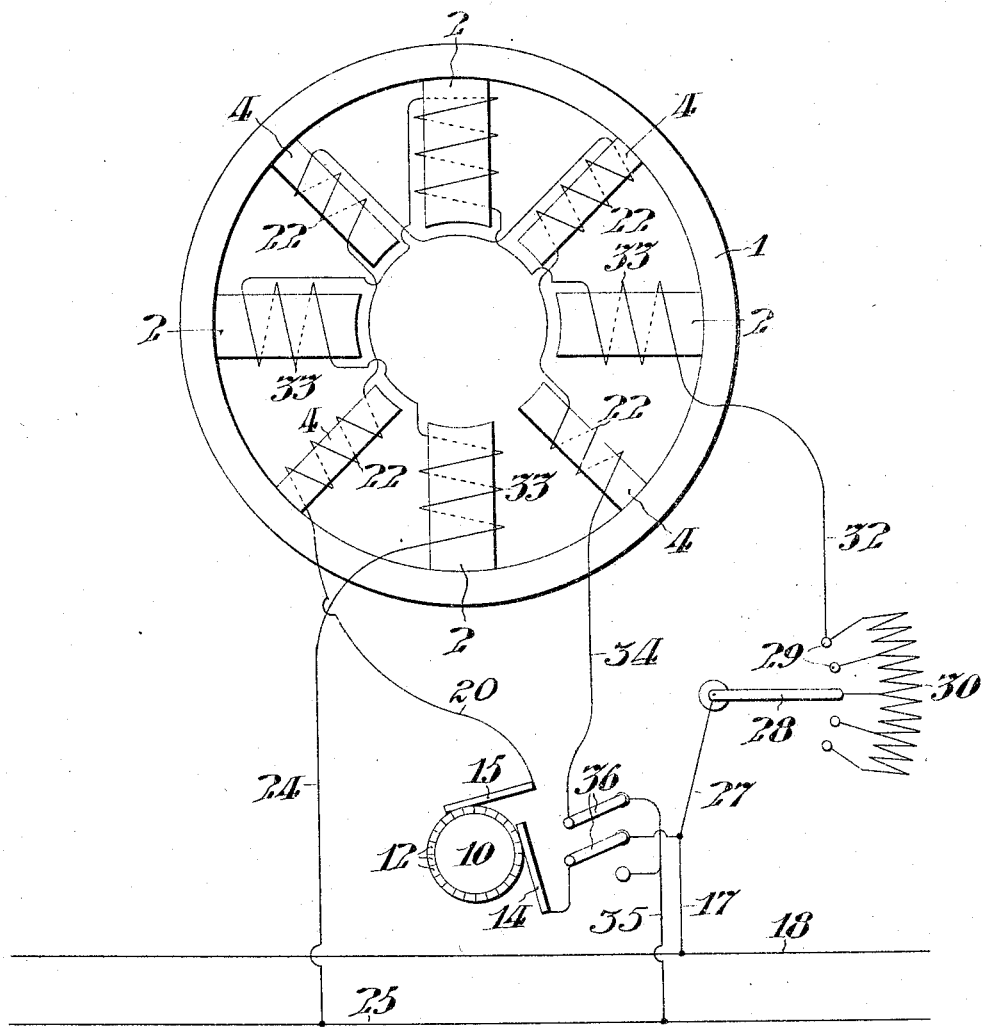
FIG.I.
FIG.II.
WITNESSES:
Clifton C. Hallowell
John C. Bergner
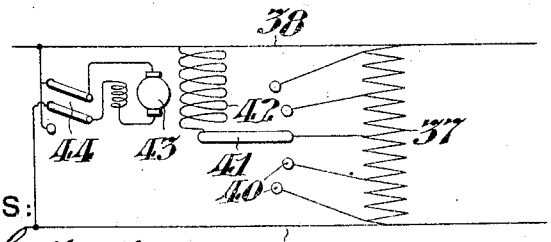
INVENTOR:
MATHIAS PFATISCHER,
by Paige, Paul & Foley
Attys.

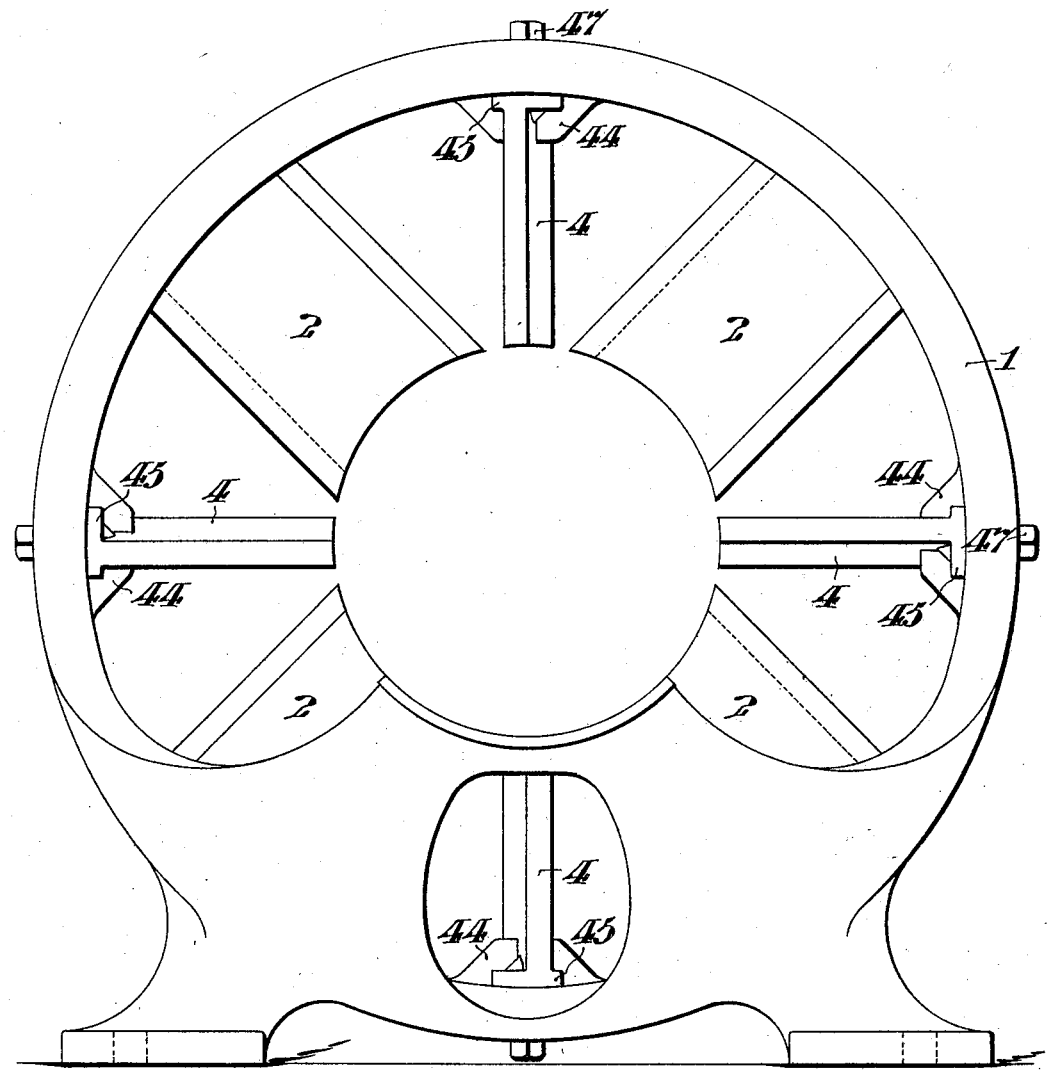
FIG. III.

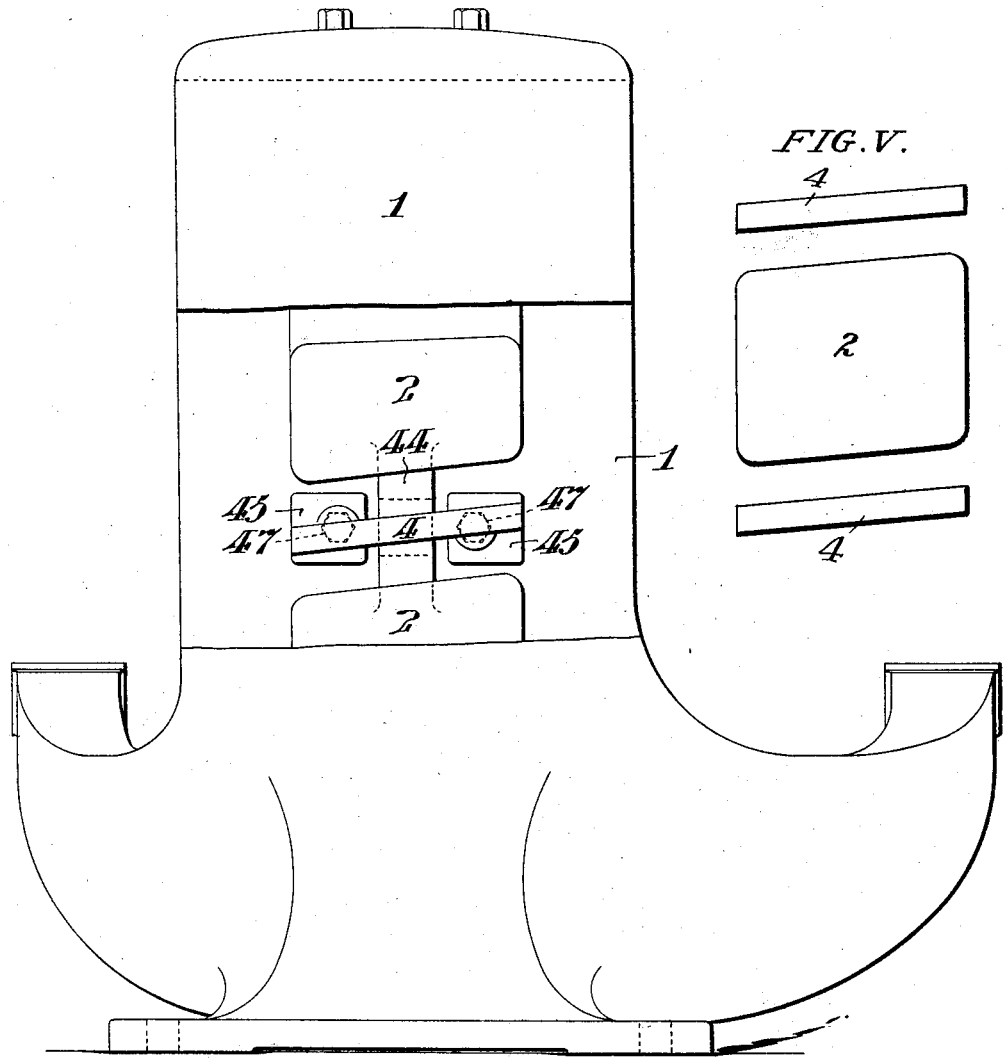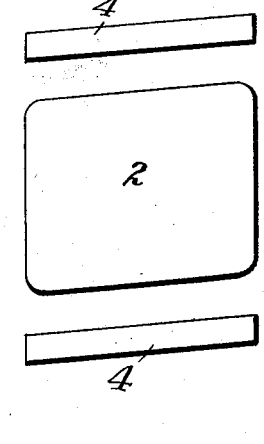

No. 775,310. Patented November 22, 1904.

UNITED STATES PATENT OFFICE.

MATHIAS PFATISCHER, OF PHILADELPHIA, PENNSYLVANIA.

VARIABLE-SPEED MOTOR.

SPECIFICATION forming part of Letters Patent No. 775,310, dated November 22, 1904.

Application filed April 7, 1904. Serial No. 202,070. (No model.)

*To all whom it may concern:*

Be it known that I, MATHIAS PFATISCHER, of Philadelphia, in the State of Pennsylvania, have invented certain new and useful Improvements in Variable-Speed Motors, whereof the following is a specification, reference being had to the accompanying drawings.

My improvements are particularly applicable to direct-current shunt-wound motors; and it is an object of my invention to provide a motor of that type which will effect commutation without sparking with a variable load as well as at variable speed and which is capable of rotation in either direction.

My present improvements may be more readily understood by first referring to certain conditions which are encountered in the operation of a motor of the class contemplated, as follows: When a brush—for instance, of carbon—is in contact with two adjoining commutator-segments, the coil connected between said segments is short-circuited on itself. The resistance of the short-circuited coil, together with the connections to the commutator, being very small as compared with the contact resistance of the brush pressing on the commutator, the strength of the currents flowing toward the brush from the respective commutator-segments will be dependent upon the relative value of the contact resistance, and the larger the latter the smaller will be the currents. As the commutator rotates the contact-surface between one segment and the brush becomes continually smaller, the contact resistance increases, and the current flowing from that segment to the brush becomes correspondingly smaller and finally reaches zero in value, whereas the reverse occurs at the adjoining segment, in which the current gradually increases from zero to its maximum value. The current thus varying in the coil short-circuited between said segments generates in the coil an electromotive force tending to maintain the said varying current, and it is this maintaining electromotive force which causes sparking under the brushes under ordinary circumstances. Moreover, said maintaining electromotive force increases as the speed of rotation increases, because the time for altering the current strength from plus to minus in said coil will be correspondingly less.

It is usual to minimize the aforesaid maintaining electromotive force by causing the commutation (reversal of current in the short-circuited coil) to take place in a weak magnetic field so constructed or arranged that it produces in the short-circuited coil an electromotive force which is opposite in direction to said maintaining electromotive force and intended to be equal to it in value. Ordinarily it is possible to bring the short-circuited armature-coils in such a compensating field by shifting the brushes, and if under such circumstances the armature speed increases said compensating field generates an increased electromotive force which counterbalances the maintaining electromotive force, which also increases with the speed. However, in said ordinary method of commutation another disturbing condition arises from the fact that the armature-coils, which carry the electric current, also react and generate a magnetic field whose influence is opposite to that which is necessary to counteract the short-circuited current, and accordingly weakens said compensatory or commutation field. Moreover, such weakening of the commutation-field is not of constant value, because it is determined by the armature-current, which varies with the load, so that if the load becomes greater the armature reaction increases, and with an increased load a commutation-field is produced which is insufficient to effect the required compensation and sparking results.

In the specific case of a direct-current shunt-wound motor having a variable speed an additional difficulty is encountered, because if the motor is to rotate at increased speed the strength of the main-field poles must be decreased, and consequently with an increased number of revolutions the commutation-field will be weakened, the short-circuit current will not be reversed by the electromotive force designed to correct it, and the sparking at the brushes will be correspondingly augmented.

Of course if it is attempted to fit the motor to run in either direction by shifting the brushes to positions equidistant between the poles they are removed from the aforesaid field of commutation and increased sparking results.

The construction and arrangement contemplated by the present invention provides a motor which, with the brushes equidistant between the poles, is capable of reversing its direction of rotation without detriment, and effects commutation in either direction of rotation without sparking with a variable load as well as at variable speed.

My improvements comprise the provision of auxiliary-field pole-pieces which are very small as compared with the main pole-pieces, which are located between the latter and provided with coils connected in series with the armature, so that all of the current taken by the latter flows through the coils of said auxiliary field, which are so proportioned and arranged as to give the proper field for commutation. All of the coils of said auxiliary field being connected in series with the armature, weakening of the field of commutation by an increased load is prevented, and said auxiliary poles produce the required compensatory field of commutation independently of the main field, which with increased number of revolutions of the armature must be correspondingly weakened, as aforesaid. Moreover, the function or effect of the auxiliary poles is independent of the direction of rotation of the armature, because if the latter is reversed the current in the auxiliary field is also reversed.

My invention comprehends all of the novel features of construction and arrangement hereinafter more definitely specified.

Figure I is a diagrammatic view showing the wiring connections of a motor conveniently embodying my improvements. Fig. II is a wiring diagram showing a modified arrangement of the field-coils with respect to the supply-mains. Fig. III is an end view of a motor-field frame particularly adapted for the embodiment of this invention. Fig. IV is a side elevation of said field-frame, having a portion broken away to show the peculiar diagonal relation of the field pole-pieces. Fig. V is a fragmentary plane development of the inner ends of the pole-pieces shown in perspective in Fig. IV.

Referring to Fig. I, the field-magnet frame 1 is provided with a series of four main-field pole-pieces 2 and a series of four auxiliary-field pole-pieces 4, the members of the two series being alternately disposed in equidistant positions. The armature 10 is mounted to rotate concentrically with respect to the two series of pole-pieces 2 and 4, and the segments 12 of its commutator-ring are respectively connected with divisional coils of the armature. Said commutator is provided with carbon brushes 14 and 15, and the former is connected by the lead 17 with the supply-main 18. Said brush 15 is connected by the lead 20 with the coils 22 of the auxiliary pole-pieces 4, which, as indicated in Fig. I, are arranged in series relation and are of respectively alternate polarity. The last coil 22 of said series is connected by the lead 24 with the other supply-main 25. The lead 27, connecting with the supply-main 18, extends to the lever 28 of the rheostat, comprising the contact-points 29 and variable-resistance coil 30, and the lead 32 extends from said coil 30 to the coils 33 upon the main pole-pieces 2, which latter coils are connected in series relation with each other, but in shunt relation with the armature. The end coil 33 of said series is connected by the leads 34 and 35 with the supply-main 25.

The direction of current through the armature and the consequent direction of rotation of the latter may be reversed by any suitable switch device—for instance, that indicated at 36 in Fig. I.

The rheostat above described is a preferable means for manually varying the strength of the main field of the motor produced by the pole-pieces 2 and their coils 33, it being noted, as aforesaid, that it is necessary to weaken said field in correspondence with any desired increase in the number of revolutions of the armature. However, such regulation of said field may be effected by other means—for instance, as shown in Fig. II, where the variable-resistance coil 37 is bridged across the supply-mains 38 and 39 and provided with contact-points 40, arranged to be traversed by the lever 41. In the latter arrangement the main field-coils are in circuit between said lever 41 and the supply-main 38, as indicated at 42 in Fig. II.

The reversal of direction of the rotation of the armature 43 (shown in Fig. II) may be conveniently effected by the switch 44.

I find it advantageous to employ a field-magnet frame such as is shown in Figs. III and IV, wherein all of the pole-pieces 2 and 4 have their faces adjoining the armature disposed in diagonal relation to the axis of rotation of the armature, for the reason that such a construction and arrangement, although permitting ample gaps between the pole-pieces, produces a practically continuous magnetic field surrounding the armature and insures a substantially uniform torque upon the latter. As shown in said figures, the auxiliary pole-pieces 4 are embraced at their central portions by lugs 44, projecting inwardly from the frame 1, and are provided with foot-pads 45 for contact with the inner periphery of said frame, to which they are independently secured by the bolts 47. It may be noted that the arrangement described facilitates the assembling of the auxiliary coils in proper position.

I do not desire to limit myself to the precise details of construction and arrangement herein set forth, as it is obvious that various modifications may be made therein without departing from the essential features of my invention.

I claim—

1. In a direct-current shunt-wound motor, the combination with an armature having a commutator; of a field-frame having a series of field-poles; coils for said poles; connections including the coils of alternate poles in said series in shunt relation to the armature; connections including other alternate coils in said series, in series relation with the armature; current-supply connections to all of the coils in said series; brushes in contact with said commutator; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

2. In a direct-current shunt-wound motor, the combination with an armature having a commutator; of a field-frame having a series of radially-disposed field pole-pieces; coils for said poles; connections including the coils of alternate poles in said series in shunt relation to the armature; connections including other alternate coils in said series, in series relation with the armature; current-supply connections to all of the coils in said series; brushes in contact with said commutator, in equidistant relation to adjoining poles in said series; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

3. In a direct-current shunt-wound motor, the combination with an armature having a commutator; of a field-frame having a series of field-poles; having their faces adjoining the armature disposed diagonally with respect to the armature-axis; coils for said poles; connections including the coils of alternate poles in said series in shunt relation to the armature; connections including other alternate coils in said series, in series relation with the armature; current-supply connections to all of the coils in said series; brushes in contact with said commutator; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

4. In a direct-current shunt-wound motor, the combination with an armature having a commutator; of a field-frame having a circular series of radially-disposed field pole-pieces, having their faces adjoining the armature disposed diagonally with respect to the armature-axis; coils for said poles; connections including the coils of alternate poles in said series in shunt relation to the armature; connections including other alternate coils in said series, in series relation with the armature; current-supply connections common to all of the coils in said series; brushes in contact with said commutator, in equidistant relation to adjoining poles in said series; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

5. In a direct-current shunt-wound motor, the combination with an armature having a commutator; of a field-frame; a circular series of separable field pole-pieces; means detachably securing said pole-pieces in said frame; coils for said poles; connections including the coils of alternate poles in said series in shunt relation to the armature; connections including other alternate coils in said series, in series relation with the armature; current-supply connections common to all of the coils in said series; brushes in contact with said commutators; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

6. In a direct-current shunt-wound motor, the combination with an armature having a commutator; of a field-frame; a circular series of field-poles, comprising two alternate series of pole-pieces of respectively different cross-sectional area; means detachably securing said pole-pieces in said frame; coils for said poles; connections including the coils of alternate poles in said series in shunt relation to the armature; connections including other alternate coils in said series, in series relation with the armature; current-supply connections common to all of the coils in said series; brushes in contact with said commutator; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

7. In a direct-current shunt-wound motor, the combination with an armature having a commutator; of a field-frame; a circular series of field-poles, comprising two alternate series of separable pole-pieces of respectively different cross-sectional area; means detachably securing said pole-pieces in said frame; coils for said poles; connections including the coils of alternate poles in said series in shunt relation to the armature; connections including other alternate coils in said series, in series relation with the armature; current-supply connections common to all of the coils in said series; brushes in contact with said commutator, in equidistant relation to adjoining poles in said series; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

8. In a direct-current shunt-wound motor, the combination with an armature having a commutator; of a field-frame; a circular series of field-poles, comprising two alternate series of separable pole-pieces of respectively different cross-sectional area, having their faces adjoining the armature disposed diagonally with respect to the armature-axis; means detachably securing said pole-pieces in said frame; coils for said poles; connections including the coils of alternate poles in said series in shunt relation to the armature; connections including other alternate coils in said series, in series relation with the armature; current-supply connections common to all of the coils in said series; brushes in contact with said commutator, in equidistant relation to adjoining poles in said series; and, means arranged to adjustably vary the strength of the field in said shunt-coils, independently of said series coils; whereby the armature is enabled to rotate at variable speed and variable load in either direction without sparking and without variation in the position of the brushes, substantially as set forth.

In testimony whereof I have hereunto signed my name, at Philadelphia, Pennsylvania, this 6th day of April, 1904.

MATHIAS PFATISCHER

Witnesses:
   ARTHUR E. PAIGE,
   ANNA F. GETZFREAD.